(Model.)

A. E. WILSON.
BALANCED ROTARY VALVE.

No. 278,648. Patented May 29, 1883.

WITNESSES:
Chas. T. Howell,
C. Sedgwick

INVENTOR:
A. E. Wilson
BY Munn & Co.
ATTORNEYS.

UNITED STATES PATENT OFFICE.

ABIEL E. WILSON, OF WORCESTER, MASSACHUSETTS.

BALANCED ROTARY VALVE.

SPECIFICATION forming part of Letters Patent No. 278,648, dated May 29, 1883.

Application filed February 28, 1883. (Model.)

*To all whom it may concern:*

Be it known that I, ABIEL E. WILSON, of Worcester, in the county of Worcester and State of Massachusetts, have invented a new and Improved Balanced Rotary Valve, of which the following is a full, clear, and exact description.

My improved valve is intended for use with regulators of pressure of steam, water, or air, or in any situation where a frictionless valve, requiring but little movement to give a wide opening, is a necessity.

The invention consists in a double valve or two valves carried by a single stem and formed with ports, combined with a body or case of suitable construction, as hereinafter described and claimed.

Reference is to be had to the accompanying drawings, forming part of this specification, in which similar letters of reference indicate corresponding parts in both the figures.

Figure 1:
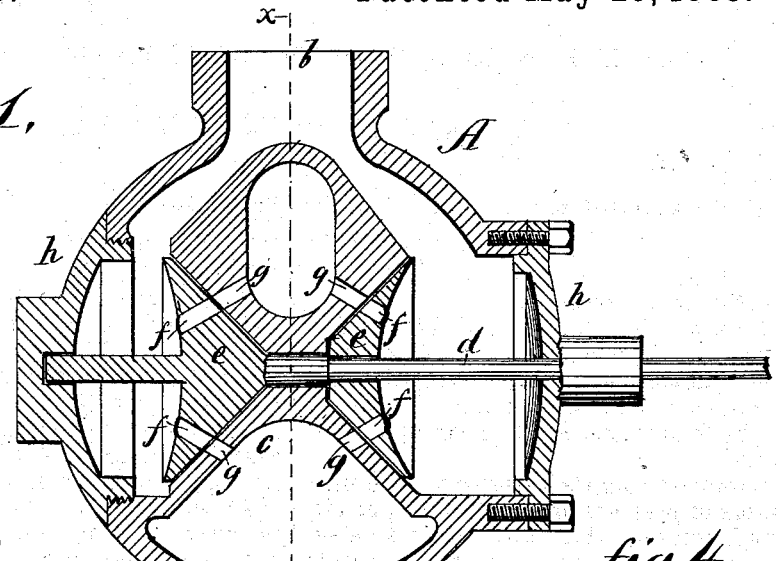
Figure 2:
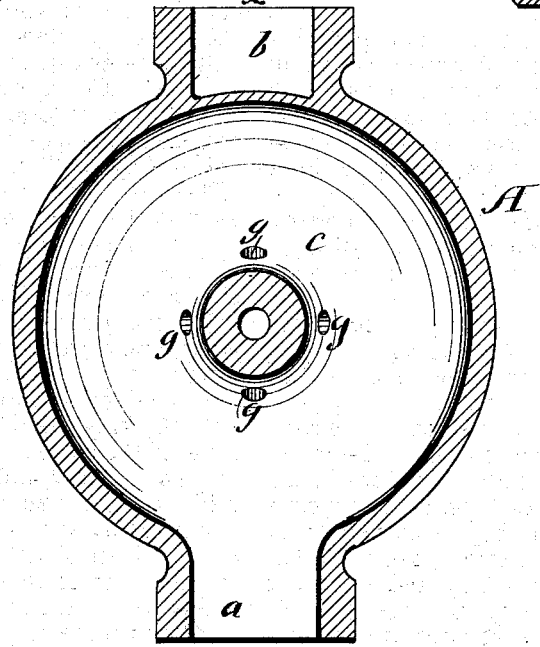

Figure 1 is a central cross-section of my improved valve, and Fig. 2 is a section on line $x$ $x$ of Fig. 1.

A is the body or case of the valve, preferably of globular form, and having an outlet, $a$, and inlet $b$ at opposite sides, which are separated by a partition, $c$.

$d$ is the valve-stem, passing through the valve-case and through the partition $c$, and $e\ e$ are the valves fixed upon the stem and seated in the partition. The partition $c$ is flanged or extended, so that both valves can be seated upon one side of the partition, with reference to the outlet, and at opposite sides of the flange, whereby they close to their seats in opposite direction and will be both pressed thereto by pressure of the fluid admitted by the inlet. The valves $e$ are made with ports $f$, and their seats pierced with corresponding openings, $g$, so that when the valves are turned slightly the ports shall be made to open and close more or less to regulate the escape of the fluid, and, the ports being made as numerous as may be, it will be seen that a slight movement of the valves is sufficient to make considerable variation in the total area of the ports.

By the construction described the two valves will be balanced by the pressure of water or other fluid, and consequently there will be little or no friction even under heavy pressure. The valves may thus be rocked by slight variations in pressure in the regulator. The valve-case is to be connected in a water-supply pipe for regulating the discharge and pressure, and the stem connected to a pressure-diaphragm in any suitable manner. The valve, may, however be used as a throttle-valve on steam-pipes, or in other situations where balanced valves are required.

Figure 3:
Figure 4:

The case A is shown as formed with openings through which the valves can be inserted and fitted, and the openings are covered with caps $h\ h$, one of which is made with a step for the end of the stem $d$, and the other provided with a stuffing-box for the stem that passes through. The valves shown are conical, and may be of that form or more or less flattened at one end, as shown on the valve at one side and in Fig. 3. Flat valves may also be used ribbed, as shown in Fig. 4, to strengthen them against the pressure.

In some cases the inlet and outlet may be reversed, so that the pressure shall act to press the valves outwardly.

Having thus described my invention, what I claim as new, and desire to secure by Letters Patent, is—

In a balanced rotary valve, the combination, with the valve-case A, having inlet $b$ and outlet $a$, of the conical valves $e$, arranged upon a common stem, $d$, and having series of ports $f$, said valves working in corresponding seats, also provided with series of coincident ports $g$, communicating with a chamber arranged interiorly of or between the valve-seats and discharging into the outlet $a$, substantially as and for the purpose set forth.

ABIEL E. WILSON.

Witnesses:
J. E. DAY,
WM. M. GATES.